(12) United States Patent
Zhang et al.

(10) Patent No.: US 12,374,699 B2
(45) Date of Patent: Jul. 29, 2025

(54) CATHODE CATALYST LAYER STRUCTURE FOR ENHANCING DURABILITY OF CATALYST AND FABRICATION METHOD THEREOF

(71) Applicant: SHANGHAI JIAO TONG UNIVERSITY, Shanghai (CN)

(72) Inventors: Junliang Zhang, Shanghai (CN); Zhifeng Zheng, Shanghai (CN); Fengjuan Zhu, Shanghai (CN); Xiaojing Cheng, Shanghai (CN); Guanghua Wei, Shanghai (CN); Fan Yang, Shanghai (CN); Guofeng Xia, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 757 days.

(21) Appl. No.: 17/607,025

(22) PCT Filed: Sep. 24, 2020

(86) PCT No.: PCT/CN2020/117323
§ 371 (c)(1),
(2) Date: Oct. 27, 2021

(87) PCT Pub. No.: WO2021/093466
PCT Pub. Date: May 20, 2021

(65) Prior Publication Data
US 2022/0216484 A1    Jul. 7, 2022

(30) Foreign Application Priority Data
Nov. 11, 2019   (CN) .......................... 201911096005.8

(51) Int. Cl.
| H01M 4/92 | (2006.01) |
| H01M 4/86 | (2006.01) |
| H01M 4/88 | (2006.01) |

(52) U.S. Cl.
CPC ......... H01M 4/921 (2013.01); H01M 4/8657 (2013.01); H01M 4/8828 (2013.01)

(58) Field of Classification Search
CPC ........ H01M 4/921; H01M 4/92; H01M 4/925; H01M 4/9075; H01M 4/8657; H01M 4/8647; H01M 4/8828
See application file for complete search history.

(56) References Cited

U.S. PATENT DOCUMENTS

| 9,120,087 B2 * | 9/2015 | Min ................... H01M 8/1004 |
| 2011/0140580 A1 | 6/2011 | Yang et al. |
| 2014/0356757 A1 * | 12/2014 | Protsailo ............ H01M 4/8636 |
| | | 429/480 |

FOREIGN PATENT DOCUMENTS

| CN | 103165915 A | 6/2013 |
| CN | 104247114 A | 12/2014 |

(Continued)

OTHER PUBLICATIONS

Andrea Baricci, et al. Modelling analysis of low platinum polymer fuel cell degradation under voltage cycling: Gradient catalyst layers with improved durability Journal of Power Sources, 2018, pp. 89-100, vol. 405.

(Continued)

*Primary Examiner* — Raymond Alejandro
(74) *Attorney, Agent, or Firm* — Bayramoglu Law Offices LLC (57) ABSTRACT

A fuel cell cathode catalyst layer structure for enhancing the durability of a catalyst is provided. The cathode catalyst layer structure includes a first catalyst portion, a second catalyst portion, and a third catalyst portion that are arranged in sequence from an area close to a diffusion layer to an area close to a proton exchange membrane (PEM); a pure platinum catalyst is placed inside the first catalyst portion, the (Continued)

second catalyst portion, and the third catalyst portion; platinum loads of the pure platinum catalysts inside the first catalyst portion, the second catalyst portion, and the third catalyst portion decrease progressively; and average particle sizes of pure platinum catalyst particles inside the first catalyst portion, the second catalyst portion, and the third catalyst portion increase progressively. The pure platinum catalyst with a large or small particle size is more resistant to corrosion, and improves the initial performance of fuel cell.

17 Claims, 7 Drawing Sheets

(56) References Cited

FOREIGN PATENT DOCUMENTS

| CN | 107146891 A | 9/2017 |
|---|---|---|
| CN | 109904469 A | 6/2019 |
| CN | 110289423 A | 9/2019 |
| CN | 110993960 A | 4/2020 |
| KR | 20060135138 A | 12/2006 |

OTHER PUBLICATIONS

Samaneh Shahgaldi, et al., Cathode catalyst layer design with gradients of ionomer distribution for proton exchange membrane fuel cells, Energy Conversion and Management, 2018, pp. 1476-1486, vol. 171.

Haoran Yu, et al. Strategies to mitigate Pt dissolution in low Pt loading proton exchange membrane fuel cell: I. A gradient Pt particle size design, Electrochimica Acta, 2017, pp. 1155-1168, vol. 247.

\* cited by examiner

CATHODE CATALYST LAYER STRUCTURE FOR ENHANCING DURABILITY OF CATALYST AND FABRICATION METHOD THEREOF

CROSS REFERENCE TO THE RELATED APPLICATIONS

This application is the national phase entry of International Application No. PCT/CN2020/117323, filed on Sep. 24, 2020, which is based upon and claims priority to Chinese Patent Application No. 201911096005.8, filed on Nov. 11, 2019, the entire contents of which are incorporated herein by reference.

TECHNICAL FIELD

The present disclosure relates to the technical field of fuel cells, and in particular to a cathode catalyst layer structure for enhancing the durability of a catalyst and a fabrication method thereof.

BACKGROUND

A fuel cell is a chemical device that directly converts chemical energy of a fuel into electrical energy, and is also known as an electrochemical generator. The fuel cell technology is the fourth power generation technology after hydropower, thermal power generation, and nuclear power generation. A fuel cell converts the Gibbs free energy in the chemical energy of a fuel into electrical energy through an electrochemical reaction, which is not limited by the Carnot cycle effect, resulting in high efficiency. In addition, since a fuel cell uses a fuel and oxygen as raw materials and involves no mechanical transmission components, there is no noise pollution and very few harmful gas emission. It can be known that, from the perspective of energy conservation and ecological environment protection, the fuel cell technology is the most promising power generation technology.

Chinese patent No. 109904469A discloses a fabrication method of a membrane-electrode assembly (MEA) with an optimized cathode catalyst layer structure, including the following steps: (1) preparing a catalyst layer ink, adding PS microspheres with a particle size of 50 nm to 800 nm, and adjusting a ratio of Pt/C to PS microspheres to prepare a catalyst layer; and (2) putting the catalyst layer in an organic solvent to remove the PS microspheres, transferring the catalyst layer onto a proton exchange membrane (PEM) by hot pressing, and hot-pressing a resulting product to a diffusion layer to obtain the MEA with an optimized cathode catalyst layer structure for a proton exchange membrane fuel cell (PEMFC). The method of the invention optimizes a pore size and a porosity inside a cathode catalyst layer and improves the gas mass transfer of the catalyst layer; and especially at a high current density, the method can significantly improve the diffuse polarization and performance of an MEA. Moreover, the process involves simple operations and easy pore-forming agent removal, and is suitable for mass production and laboratory operations.

At present, the commercialization of fuel cells in automobiles requires a service life of a fuel cell to reach at least 5,000 h. However, most of the catalysts in the prior art (including the catalyst provided in the above patent) cannot meet requirements, and thus almost all fuel cell stacks in China have a life of less than 5,000 h.

In a fuel cell, an oxygen reduction reaction is a rate determining step in the entire electrochemical reaction process, and a cathode catalyst layer is a site where the oxygen reduction reaction proceeds. Therefore, a structure of the catalyst layer and the stability of a catalyst will directly affect a service life of the fuel cell. Studies have shown that a fuel cell catalyst will experience significant performance degradation during a vehicular operation process, resulting in reduced catalytic activity and increased resistance to oxygen and proton mass transfer in an electrode.

Because there are large fluctuations in operating power requirements due to vehicular operating conditions such as climbing, starting, and stopping, an output voltage of a fuel cell will also fluctuate. During an electric potential cycling process, a platinum catalyst will undergo Ostwald ripening, such that an average particle size of the catalyst will be eventually increased and an effective specific surface area (SSA) of the catalyst will be reduced in long-term operation, that is, the number of active sites for a catalytic reaction and a rate of a cathode catalytic reaction will be reduced, thereby causing the catalyst to fail. Moreover, platinum ions dissolved at a high potential will migrate toward a PEM under the action of concentration diffusion and electromigration, and then will be reduced by hydrogen in the PEM, which will cause loss of a platinum mass and significantly increased attenuation of the catalyst near the PEM, thereby causing increased loss in the oxygen and proton mass transfer in the cathode catalyst layer during long-term operation.

SUMMARY

In view of the shortcomings in the prior art, one objective of the present disclosure is to provide a cathode catalyst layer structure for enhancing the durability of a catalyst, where a structure of the initial cathode catalyst layer is optimized to reduce loss in an electrochemically active surface area (ECSA) of a catalyst during a potential sweep process and optimize an ECSA distribution and a platinum mass distribution during an attenuation process, which helps to reduce loss in the oxygen and proton mass transfer during an attenuation process and improve the durability of a fuel cell.

In order to achieve the above-mentioned objective of the present disclosure, the present disclosure provides the following technical solution: a cathode catalyst layer structure for enhancing the durability of a catalyst, including a first catalyst portion, a second catalyst portion, and a third catalyst portion, where the first catalyst portion, the second catalyst portion, and the third catalyst portion are arranged in sequence from an area close to a diffusion layer to an area close to a PEM; a pure Pt catalyst and/or a Pt-based alloy catalyst is placed inside the first catalyst portion, the second catalyst portion, and the third catalyst portion; a platinum load in the pure Pt catalyst and/or the Pt-based alloy catalyst inside the first catalyst portion is greater than or equal to a platinum load in the pure Pt catalyst and/or the Pt-based alloy catalyst inside the second catalyst portion, and the platinum load in the pure Pt catalyst and/or the Pt-based alloy catalyst inside the second catalyst portion is greater than or equal to a platinum load in the pure Pt catalyst and/or the Pt-based alloy catalyst inside the third catalyst portion; and average particle sizes of the pure Pt catalyst and/or the Pt-based alloy catalyst inside the first catalyst portion, the pure Pt catalyst and/or the Pt-based alloy catalyst inside the second catalyst portion, and the pure Pt catalyst and/or the Pt-based alloy catalyst inside the third catalyst portion increase progressively.

Preferably, the platinum load in the pure Pt catalyst and/or the Pt-based alloy catalyst inside the first catalyst portion may be 1.0 to 1.4 times the platinum load in the pure Pt catalyst and/or the Pt-based alloy catalyst inside the second catalyst portion.

Preferably, the platinum load in the pure Pt catalyst and/or the Pt-based alloy catalyst inside the third catalyst portion may be 0.6 to 1.0 time the platinum load in the pure Pt catalyst and/or the Pt-based alloy catalyst inside the second catalyst portion.

Preferably, catalyst particles in the first catalyst portion may have an average particle size of about 2.5 nm to 3.4 nm; catalyst particles in the second catalyst portion may have an average particle size of about 3.5 nm to 4.4 nm; and catalyst particles in the third catalyst portion may have an average particle size of about 4.5 nm to 5.5 nm.

Preferably, the Pt-based alloy may include a Pt—Co alloy and a Pt—Ni alloy.

Preferably, a total thickness of the first catalyst portion, the second catalyst portion, and the third catalyst portion may be 10 μm to 18 μm.

Preferably, the first catalyst portion, the second catalyst portion, and the third catalyst portion may have the same volume; and the pure Pt catalyst and/or the Pt-based alloy catalyst may be uniformly distributed inside the first catalyst portion, the pure Pt catalyst and/or the Pt-based alloy catalyst may be uniformly distributed inside the second catalyst portion, and the pure Pt catalyst and/or the Pt-based alloy catalyst may be uniformly distributed inside the third catalyst portion.

Preferably, a total platinum load of the first catalyst portion, the second catalyst portion, and the third catalyst portion may be 0.1 $mg_{Pt}/cm^2$ to 0.4 $mg_{Pt}/cm^2$.

Another objective of the present disclosure is to provide a fabrication method of the cathode catalyst layer structure for enhancing the durability of a catalyst. In order to achieve the above-mentioned objective of the present disclosure, the present disclosure provides the following technical solution: a fabrication method of the cathode catalyst layer structure for enhancing the durability of a catalyst, including the following steps:

A. preparing slurries with different catalyst particle sizes; and

B. electrospraying the slurries of catalysts with different particle sizes and different loads onto the PEM or the diffusion layer in sequence and drying, or electrospraying the slurries onto polytetrafluoroethylene (PTEF) and transferring multiple times.

Compared with the prior art, the present disclosure has the following beneficial effects.

(1) The present disclosure relates to a cathode catalyst layer structure for enhancing the durability of a catalyst and a fabrication method thereof. The cathode catalyst layer structure with gradient platinum loads and gradient catalyst particle sizes can greatly reduce the ECSA and platinum mass loss of the catalyst and help to strengthen the durability of the catalyst.

Figure 2:
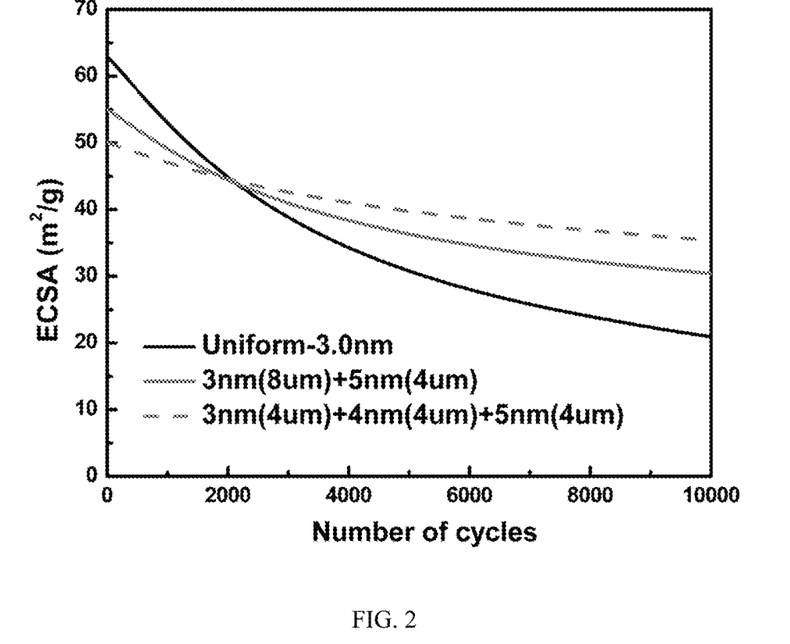
FIG. 2 shows the ECSA attenuation comparison of the three catalyst layer structures of Example 1 and Comparative Examples 1 and 2.
Figure 3:
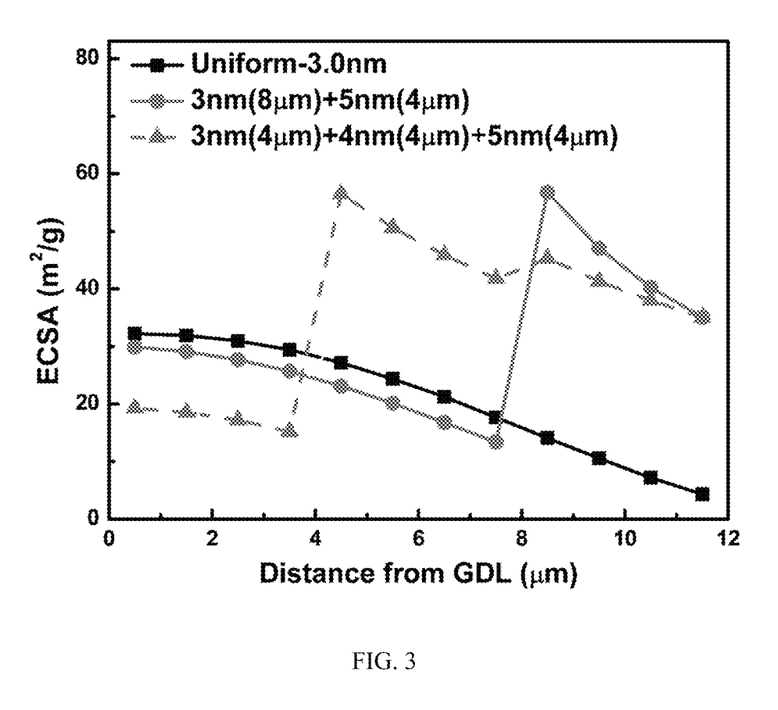
FIG. 3 shows the ECSA distribution comparison of the three catalyst layer structures of Example 1 and Comparative Examples 1 and 2 after attenuation.
Figure 4:
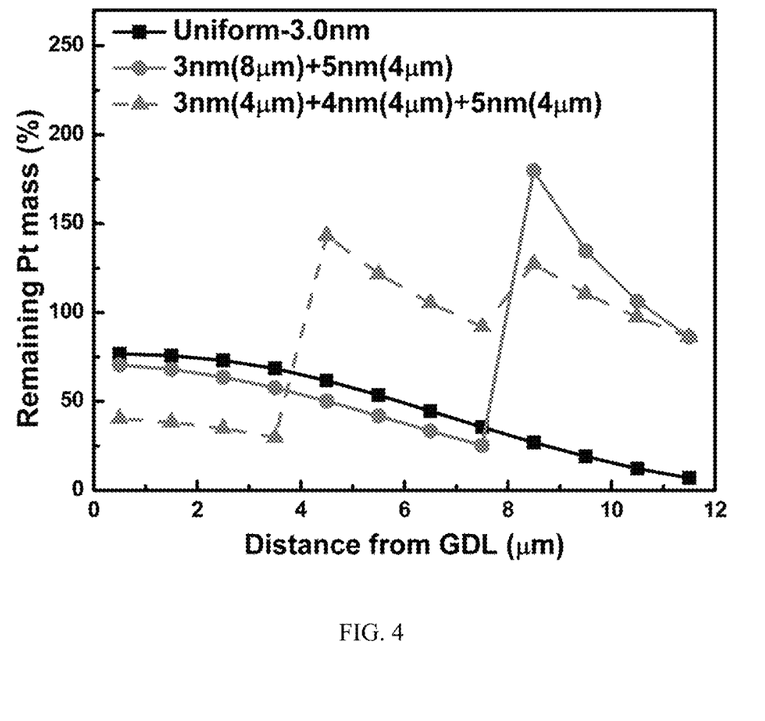
FIG. 4 shows the remaining platinum mass distribution comparison of the three catalyst layer structures of Example 1 and Comparative Examples 1 and 2 after attenuation.

(2) When a total platinum load is the same and loaded Pt is uniformly distributed, an initial ECSA of a catalyst layer using 3/4/5 nm platinum catalyst is indeed higher than that of a catalyst layer using 3/3/3 nm or 3/3/5 nm platinum catalyst, but it can be found that, after a period of attenuation, the catalyst layer using 3/4/5 nm platinum catalyst has higher ECSA (as shown in FIG. 2) and also has more uniform ECSA and platinum mass distributions (as shown in FIG. 3 and FIG. 4).

Figure 7:
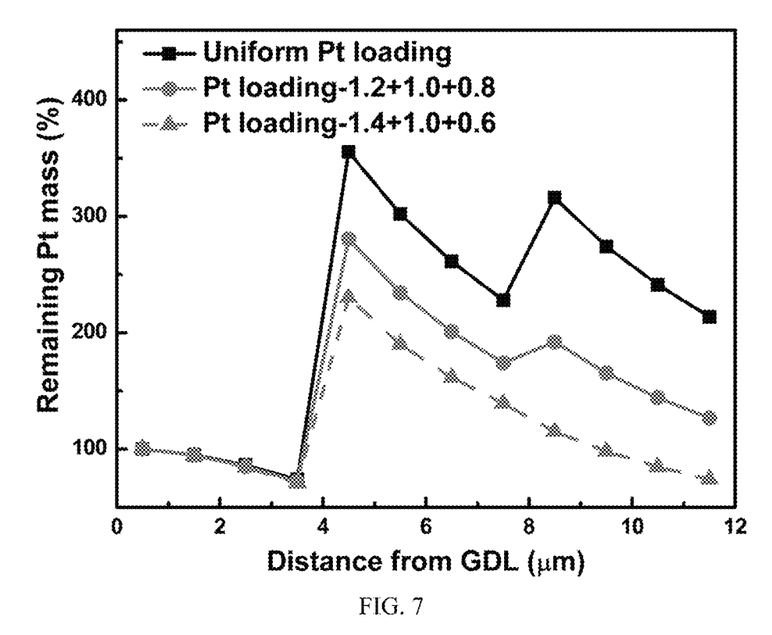
FIG. 7 shows the remaining platinum mass distribution comparison of the three catalyst layer structures of Examples 1, 2, and 3 after attenuation.

(3) By comparing varying platinum loads in a thickness direction of the catalyst layer, it can be known that appropriately reducing a platinum load at the membrane side can make ECSA and platinum mass distributions relatively uniform during an attenuation process (as shown in FIG. 7), and thus can reduce mass transfer loss inside an attenuated catalyst layer, thereby improving the performance of the attenuated cathode catalyst layer.

BRIEF DESCRIPTION OF THE DRAWINGS

Other features, objectives, and advantages of the present disclosure will become more apparent by reading the detailed description of non-limiting examples with reference to the following accompanying drawings.

DETAILED DESCRIPTION OF THE EMBODIMENTS

The following examples will help those skilled in the art to further understand the present disclosure, but do not limit the present disclosure in any way. Those of ordinary skill in the art can further make several variations and improvements without departing from the conception of the present disclosure, but these variations and improvements all fall within the protection scope of the present disclosure.

The present disclosure provides the following technical solution: a cathode catalyst layer structure for enhancing the durability of a catalyst, including a first catalyst portion, a second catalyst portion, and a third catalyst portion, where the first catalyst portion, the second catalyst portion, and the third catalyst portion are arranged in sequence from an area close to a diffusion layer to an area close to an PEM; a pure Pt catalyst and/or a Pt-based alloy catalyst is placed inside the first catalyst portion, the second catalyst portion, and the third catalyst portion; a platinum load in the pure Pt catalyst and/or the Pt-based alloy catalyst inside the first catalyst portion is greater than or equal to a platinum load in the pure Pt catalyst and/or the Pt-based alloy catalyst inside the second catalyst portion, and the platinum load in the pure Pt catalyst and/or the Pt-based alloy catalyst inside the second catalyst portion is greater than or equal to a platinum load in the pure Pt catalyst and/or the Pt-based alloy catalyst inside the third catalyst portion; and average particle sizes of the pure Pt catalyst and/or the Pt-based alloy catalyst inside the first catalyst portion, the pure Pt catalyst and/or the Pt-based alloy catalyst inside the second catalyst portion, and the pure Pt catalyst and/or the Pt-based alloy catalyst inside the third catalyst portion increase progressively.

The platinum load in the pure Pt catalyst and/or the Pt-based alloy catalyst inside the first catalyst portion may be 1.0 to 1.4 times the platinum load in the pure Pt catalyst and/or the Pt-based alloy catalyst inside the second catalyst portion.

The platinum load in the pure Pt catalyst and/or the Pt-based alloy catalyst inside the third catalyst portion may be 0.6 to 1.0 time the platinum load in the pure Pt catalyst and/or the Pt-based alloy catalyst inside the second catalyst portion.

Catalyst particles in the first catalyst portion may have an average particle size of about 2.5 nm to 3.4 nm; catalyst particles in the second catalyst portion may have an average particle size of about 3.5 nm to 4.4 nm; and catalyst particles in the third catalyst portion may have an average particle size of about 4.5 nm to 5.5 nm.

The Pt-based alloy may include a Pt—Co alloy and a Pt—Ni alloy.

A total thickness of the first catalyst portion, the second catalyst portion, and the third catalyst portion may be 10 µm to 18 µm.

The first catalyst portion, the second catalyst portion, and the third catalyst portion may have the same volume; and the pure Pt catalyst and/or the Pt-based alloy catalyst may be uniformly distributed inside the first catalyst portion, the pure Pt catalyst and/or the Pt-based alloy catalyst may be uniformly distributed inside the second catalyst portion, and the pure Pt catalyst and/or the Pt-based alloy catalyst may be uniformly distributed inside the third catalyst portion.

A total platinum load of the first catalyst portion, the second catalyst portion, and the third catalyst portion may be 0.1 $mg_{Pt}/cm^2$ to 0.4 $mg_{Pt}/cm^2$.

The present disclosure provides the following technical solution: a fabrication method of the cathode catalyst layer structure for enhancing the durability of a catalyst, including the following steps: A. preparing slurries with different catalyst particle sizes; and B. electrospraying the slurries of catalysts with different particle sizes and different loads onto a PEM or a diffusion layer in sequence and drying, or electrospraying the slurries onto PTEF and transferring multiple times.

It should be noted that, because the measurement of an average particle size of a catalyst has human error (±1 nm), only the following three particle sizes are used for the catalyst layer gradient design in the following examples: 3 nm, 4 nm, and 5 nm. Moreover, as the practicability of the present disclosure is not limited to the total thickness and the total Pt load of the catalyst layer, only the catalyst layer thickness of 12 µm and the Pt load of 0.4 $mg_{Pt}/cm^2$ are used for illustration in the following examples. All experimental schemes within the above ranges can lead to the cathode catalyst layer structure for enhancing the durability of a catalyst provided in the present disclosure. The present disclosure is described in detail below with reference to specific examples.

I. Examples 1 to 3 and Comparative Examples 1 and 2

Example 1

A cathode catalyst layer structure for enhancing the durability of a catalyst was provided, and a fabrication method thereof included the following steps: A. slurries with different catalyst particle sizes were prepared; and B. the slurries of catalysts with different particle sizes and different loads were electrosprayed onto a PEM or a diffusion layer in sequence and dried, or the slurries were electrosprayed onto PTEF and then transferred multiple times. The cathode catalyst layer structure for enhancing the durability of a catalyst included a first catalyst portion, a second catalyst portion, and a third catalyst portion that were arranged in sequence from an area close to a diffusion layer to an area close to an PEM; a pure Pt catalyst was placed inside the first catalyst portion, the second catalyst portion, and the third catalyst portion; and a gradient cathode catalyst layer with catalyst particles of a large average particle size and uniform platinum loading was arranged in the area close to the PEM.

Figure 1:
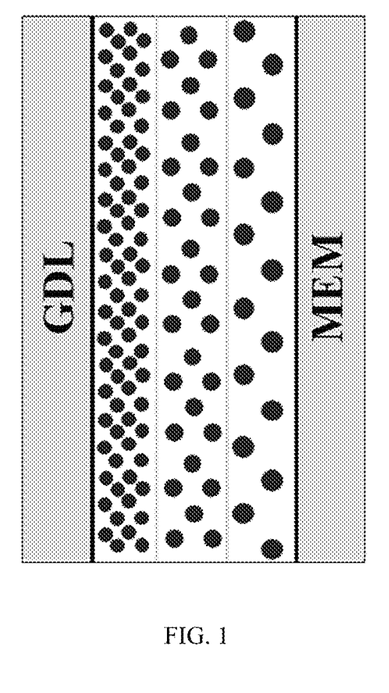
FIG. 1 is a schematic diagram of a structure of the novel cathode catalyst layer designed in Example 1.

As shown in FIG. 1, catalyst particles inside the third catalyst portion close to the PEM had an average particle size of 5.0 nm; catalyst particles inside the second catalyst portion had an average particle size of 4.0 nm; and catalyst particles inside the first catalyst portion close to the diffusion layer had an average particle size of 3.0 nm. The cathode catalyst layer structure for enhancing the durability of a catalyst had a total thickness of 12 µm, and the first catalyst portion, the second catalyst portion, and the third catalyst portion all had a thickness of 4 µm; the cathode catalyst layer structure for enhancing the durability of a catalyst had a total platinum load of 0.4 $mg_{Pt}/cm^2$; a catalyst particle size distribution inside each catalyst portion was uniform; and the catalyst layer had a designation of 3 nm(4 µm)+4 nm(4 µm)+5 nm (4 µm) or Uniform Pt loading.

Example 2

In view of the obvious activity loss of the traditional cathode catalyst layer during the long-term operation of a fuel cell and especially the problem existing close to the PEM, a cathode catalyst layer structure for enhancing the durability of a catalyst was provided in this example. The cathode catalyst layer structure for enhancing the durability of a catalyst included a first catalyst portion, a second catalyst portion, and a third catalyst portion that were arranged in sequence from an area close to a diffusion layer to an area close to an PEM; a pure Pt catalyst was placed inside the first catalyst portion, the second catalyst portion, and the third catalyst portion; and a gradient cathode catalyst layer with catalyst particles of a large average particle size but low platinum load was arranged in the area close to the PEM.

As shown in FIG. 1, catalyst particles inside the third catalyst portion close to the PEM had an average particle size of 5.0 nm, and a platinum load was 0.8 time a platinum load in the third catalyst portion; catalyst particles inside the second catalyst portion had an average particle size of 4.0 nm; and catalyst particles inside the first catalyst portion close to the diffusion layer had an average particle size of 3.0 nm, and a platinum load was 1.2 times an average platinum load in the catalyst layer. The cathode catalyst layer structure for enhancing the durability of a catalyst had a total thickness of 12 µm, and the first catalyst portion, the second catalyst portion, and the third catalyst portion all had a thickness of 4 µm; the cathode catalyst layer structure for enhancing the durability of a catalyst had a total platinum load of 0.4 $mg_{Pt}/cm^2$; catalyst particle size and platinum load distributions inside each catalyst portion were uniform; and the catalyst layer had a designation of Pt loading-1.2+1.0+0.8.

Example 3

In view of the obvious activity loss of the traditional cathode catalyst layer during the long-term operation of a fuel cell and especially the problem existing close to the PEM, a cathode catalyst layer structure for enhancing the durability of a catalyst was provided in this example. The cathode catalyst layer structure for enhancing the durability of a catalyst included a first catalyst portion, a second catalyst portion, and a third catalyst portion that were arranged in sequence from an area close to a diffusion layer to an area close to an PEM; a pure Pt catalyst was placed inside the first catalyst portion, the second catalyst portion, and the third catalyst portion; and a gradient cathode catalyst layer with catalyst particles of a large average particle size but low platinum load was arranged in the area close to the PEM.

As shown in FIG. 1, catalyst particles inside the third catalyst portion close to the PEM had an average particle size of 5.0 nm, and a platinum load was 0.6 time a platinum load in the third catalyst portion; catalyst particles inside the second catalyst portion had an average particle size of 4.0 nm; and catalyst particles inside the first catalyst portion close to the diffusion layer had an average particle size of 3.0 nm, and a platinum load was 1.4 times an average platinum load in the catalyst layer. The cathode catalyst layer structure for enhancing the durability of a catalyst had a total thickness of 12 μm, and the first catalyst portion, the second catalyst portion, and the third catalyst portion all had a thickness of 4 μm; the cathode catalyst layer structure for enhancing the durability of a catalyst had a total platinum load of 0.4 $mg_{Pt}/cm^2$; catalyst particle size and platinum load distributions inside each catalyst portion were uniform; and the catalyst layer had a designation of Pt loading-1.4+1.0+0.6.

Comparative Example 1

A cathode catalyst layer structure was provided, which was different from Example 1 only in that: the cathode catalyst layer structure had a thickness of 12 μm and included a first catalyst portion, a second catalyst portion, and a third catalyst portion; a pure Pt catalyst was placed inside the first catalyst portion, the second catalyst portion, and the third catalyst portion; the pure Pt catalysts inside the first catalyst portion, the second catalyst portion, and the third catalyst portion had an average particle size of 3.0 nm and a total platinum load of 0.4 $mg_{Pt}/cm^2$; and platinum load and catalyst particle size distributions in the cathode catalyst layer structure were all uniform. The cathode catalyst layer had a designation of Uniform-3.0 nm.

Comparative Example 2

A cathode catalyst layer structure was provided, which was different from Example 1 only in that: the cathode catalyst layer structure had a thickness of 12 μm and included a first catalyst portion, a second catalyst portion, and a third catalyst portion; a pure Pt catalyst was placed inside the first catalyst portion, the second catalyst portion, and the third catalyst portion; the pure Pt catalysts inside the first catalyst portion and the second catalyst portion had an average particle size of 3.0 nm, and the pure Pt catalyst inside the third catalyst portion had an average particle size of 5.0 nm; the three catalyst portions had a total platinum load of 0.4 mgPt/cm$^2$; and a platinum load distribution in the cathode catalyst layer structure was uniform. The cathode catalyst layer had a designation of 3 nm (8 μm)+5 nm (4 μm).

II. Durability Test

Experimental conditions:
The durability test was conducted at 80° C. in a fully humid $H_2/N2$ atmosphere, with a potential range of 0.6 V to 1.0 V and a sweep rate of 20 mV/s for 10,000 cycles.
Tested indexes:
Total ECSA loss, ECSA distribution, and remaining platinum mass distribution.

III. Experimental Results

FIG. 2 shows the influence of the number of layers in a catalyst layer on the ECSA attenuation, where the single-layer uniform catalyst layer is a traditional catalyst layer. It can be seen from FIG. 2 that, although the use of a catalyst with a large particle size will reduce the initial ECSA to some extent, the use of catalyst particles with a large particle size at the membrane side obviously helps to improve the durability of the catalyst, where a high ECSA can still be maintained after attenuation; and the arrangement of a multi-layer gradient catalyst particle size distribution will lead to a better effect. It can be seen from FIG. 3 and FIG. 4 that the use of a three-layer catalyst particle size structure greatly improves the attenuation of the catalyst at the membrane side and the retention of ECSA in the entire catalyst layer, but will relatively increase the attenuation of the catalyst at the diffusion layer (GDL) side.

Figure 5:
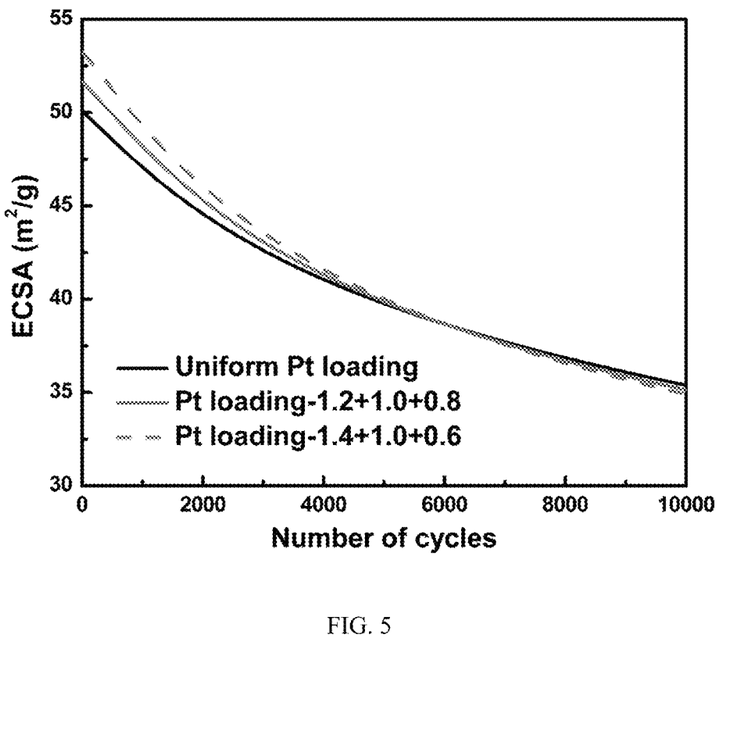
FIG. 5 shows the ECSA attenuation comparison of the three catalyst layer structures of Examples 1, 2, and 3.
Figure 6:
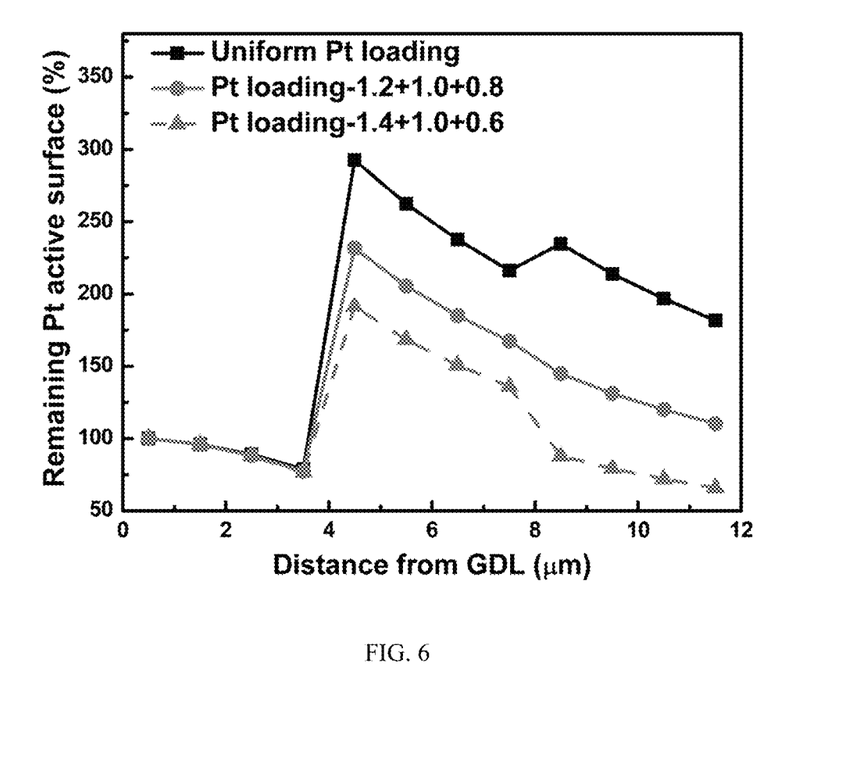
FIG. 6 shows the ECSA distribution comparison of the three catalyst layer structures of Examples 1, 2, and 3 after attenuation.

In order to further optimize the structure of the gradient catalyst layer, the present disclosure proposes to adopt a higher Pt load at the GDL side. FIG. 5 to FIG. 7 show the comparison of results of changing the Pt loads in different catalyst portions on the three-layer gradient catalyst layer structure. It can be seen from FIG. 5 that reducing the Pt load in the large-particle-size region at the membrane side and increasing the Pt load in the small-particle-size region at the GDL side will increase the ECSA attenuation in the entire catalyst layer, which is predictable because small particles have a large surface tension and leads to a high dissolution rate of Pt atoms; but there is little effect on the final ECSA. It can be seen from FIG. 6 and FIG. 7 that appropriately increasing the platinum load in the small-particle-size region at the GDL side can greatly improve the platinum active surface area and the uniformity of platinum mass distribution after attenuation, thereby facilitating the reduction in mass transfer loss during an attenuation process and further increasing a service life of a fuel cell. Compared with the catalyst layer structure of Example 3, it can be seen that excessively reducing a platinum load in the catalyst at the membrane side may not ensure sufficient catalytic active sites during an attenuation process of the catalyst at the membrane side, which is not conducive to the service performance of the entire process. Therefore, the present disclosure believes that, the optimal platinum load distribution should be as follows: a platinum load in the first catalyst portion is 1.0 to 1.4 times that in the second catalyst portion, while a platinum load in the third catalyst portion is 1.0 to 0.6 time that in the second catalyst portion.

The specific examples of the present disclosure are described above. It should be understood that the present disclosure is not limited to the above specific implementations, and a person skilled in the art can make various variations or modifications within the scope of the claims without affecting the essence of the present disclosure. The examples in the application and features in the examples may be arbitrarily combined with each other in a non-conflicting situation.

What is claimed is:

1. A cathode catalyst layer structure for enhancing a durability of a catalyst, comprising
a first catalyst layer,
a second catalyst layer, and
a third catalyst layer, wherein
the first catalyst layer, the second catalyst layer, and the third catalyst layer are arranged in sequence from an area adjacent to a diffusion layer to an area adjacent to a proton exchange membrane (PEM);
a pure Pt catalyst and/or a Pt-based alloy catalyst is placed inside the first catalyst layer, the second catalyst layer, and the third catalyst layer;
a platinum load in the pure Pt catalyst and/or the Pt-based alloy catalyst inside the first catalyst-layer is greater than a platinum load in the pure Pt catalyst and/or the Pt-based alloy catalyst inside the second catalyst layer, and the platinum load in the pure Pt catalyst and/or the Pt-based alloy catalyst inside the second catalyst layer is greater than a platinum load in the pure Pt catalyst and/or the Pt-based alloy catalyst inside the third catalyst layer; and
an average particle size of the pure Pt catalyst and/or the Pt-based alloy catalyst inside the first catalyst layer is greater than an average particle size of the pure Pt catalyst and/or the Pt-based alloy catalyst inside the second catalyst layer, and the average particle size of the pure Pt catalyst and/or the Pt-based alloy catalyst inside the second catalyst layer is greater than an average particle size of the pure Pt catalyst and/or the Pt-based alloy catalyst inside the third catalyst layer.

2. The cathode catalyst layer structure for enhancing the durability of the catalyst according to claim 1, wherein the platinum load in the pure Pt catalyst and/or the Pt-based alloy catalyst inside the first catalyst layer is 1.0 to 1.4 times the platinum load in the pure Pt catalyst and/or the Pt-based alloy catalyst inside the second catalyst layer.

3. The cathode catalyst layer structure for enhancing the durability of the catalyst according to claim 1, wherein the platinum load in the pure Pt catalyst and/or the Pt-based alloy catalyst inside the third catalyst layer is 0.6 to 1.0 times the platinum load in the pure Pt catalyst and/or the Pt-based alloy catalyst inside the second catalyst layer.

4. The cathode catalyst layer structure for enhancing the durability of the catalyst according to claim 1, wherein
catalyst particles in the first catalyst layer have an average particle size of 2.5 nm to 3.4 nm;
catalyst particles in the second catalyst layer have an average particle size of 3.5 nm to 4.4 nm; and
catalyst particles in the third catalyst portion layer have an average particle size of 4.5 nm to 5.5 nm.

5. The cathode catalyst layer structure for enhancing the durability of the catalyst according to claim 1, wherein the Pt-based alloy catalyst comprises a Pt-Co alloy and a Pt-Ni alloy.

6. The cathode catalyst layer structure for enhancing the durability of the catalyst according to claim 1, wherein a total thickness of the first catalyst layer, the second catalyst layer, and the third catalyst layer is 10 μm to 18 μm.

7. The cathode catalyst layer structure for enhancing the durability of the catalyst according to claim 5, wherein the first catalyst layer, the second catalyst layer, and the third catalyst layer have a same volume; and the pure Pt catalyst and/or the Pt-based alloy catalyst is/are uniformly distributed inside the first catalyst layer, the pure Pt catalyst and/or the Pt-based alloy catalyst is/are uniformly distributed inside the second catalyst layer, and the pure Pt catalyst and/or the Pt-based alloy catalyst is/are uniformly distributed inside the third catalyst portion layer.

8. The cathode catalyst layer structure for enhancing the durability of the catalyst according to claim 5, wherein a total platinum load of the first catalyst layer, the second catalyst layer, and the third catalyst layer is 0.1 $mg_{Pt}/cm^2$ to 0.4 $mg_{Pt}/cm^2$.

9. The cathode catalyst layer structure for enhancing the durability of the catalyst according to claim 2, wherein the platinum load in the pure Pt catalyst and/or the Pt-based alloy catalyst inside the third catalyst layer is 0.6 to 1.0 times the platinum load in the pure Pt catalyst and/or the Pt-based alloy catalyst inside the second catalyst layer.

10. A fabrication method of the cathode catalyst layer structure for enhancing the durability of the catalyst according to claim 1, comprising the following steps:
preparing slurries with catalysts of different particle sizes; and
electrospraying the slurries of the catalysts with different particle sizes and different loads onto the PEM or the diffusion layer in sequence and drying, or electrospraying the slurries onto polytetrafluoroethylene (PTEF) and transferring multiple times.

11. The fabrication method of the cathode catalyst layer structure for enhancing the durability of the catalyst according to claim 10, wherein the platinum load in the pure Pt catalyst and/or the Pt-based alloy catalyst inside the first catalyst layer is 1.0 to 1.4 times the platinum load in the pure Pt catalyst and/or the Pt-based alloy catalyst inside the second catalyst layer.

12. The fabrication method of the cathode catalyst layer structure for enhancing the durability of the catalyst according to claim 10, wherein the platinum load in the pure Pt catalyst and/or the Pt-based alloy catalyst inside the third catalyst layer is 0.6 to 1.0 time the platinum load in the pure Pt catalyst and/or the Pt-based alloy catalyst inside the second catalyst layer.

13. The fabrication method of the cathode catalyst layer structure for enhancing the durability of the catalyst according to claim 10, wherein catalyst particles in the first catalyst layer have an average particle size of 2.5 nm to 3.4 nm; catalyst particles in the second catalyst layer have an average particle size of 3.5 nm to 4.4 nm; and catalyst particles in the third catalyst layer have an average particle size of 4.5 nm to 5.5 nm.

14. The fabrication method of the cathode catalyst layer structure for enhancing the durability of the catalyst according to claim 10, wherein the Pt-based alloy catalyst comprises a Pt-Co alloy and a Pt-Ni alloy.

15. The fabrication method of the cathode catalyst layer structure for enhancing the durability of the catalyst according to claim 10, wherein a total thickness of the first catalyst layer, the second catalyst layer, and the third catalyst layer is 10 μm to 18 μm.

16. The fabrication method of the cathode catalyst layer structure for enhancing the durability of the catalyst according to claim 14, wherein the first catalyst layer, the second catalyst layer, and the third catalyst layer have a same volume; and the pure Pt catalyst and/or the Pt-based alloy catalyst is/are uniformly distributed inside the first catalyst layer, the pure Pt catalyst and/or the Pt-based alloy catalyst is/are uniformly distributed inside the second catalyst layer, and the pure Pt catalyst and/or the Pt-based alloy catalyst is/are uniformly distributed inside the third catalyst layer.

17. The fabrication method of the cathode catalyst layer structure for enhancing the durability of the catalyst according to claim 14, wherein a total platinum load of the first catalyst layer, the second catalyst layer, and the third catalyst layer is 0.1 $mg_{Pt}/cm^2$ to 0.4 $mg_{Pt}/cm^2$.

* * * * *